Figure 1:
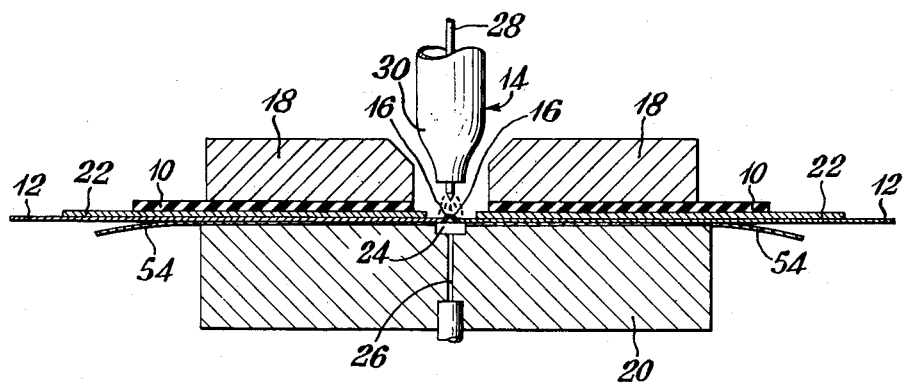

March 19, 1963 C. M. HEATH ET AL 3,082,318

THIN METAL FOIL ARC WELDING APPARATUS AND PROCESS

Filed Feb. 27, 1961

INVENTORS
CARLOS M. HEATH
ARTHUR F. AXELSON
BY Barnwell R. King
ATTORNEY

United States Patent Office 3,082,318
Patented Mar. 19, 1963

3,082,318
THIN METAL FOIL ARC WELDING
APPARATUS AND PROCESS
Carlos M. Heath and Arthur F. Axelson, Kenmore,
N.Y., assignors to Union Carbide Corporation, a corporation of New York
Filed Feb. 27, 1961, Ser. No. 91,887
8 Claims. (Cl. 219—137)

This invention relates to work-in-circuit arc welding, and more particularly to fusion welding thin metal foil by the inert gas shielded arc process with a non-consumable electrode.

The present application is a continuation-in-part of our application, Ser. No. 783,820, filed Dec. 30, 1958, now Patent No. 2,975,266, dated March 14, 1961, which is concerned with fusion welding thin metal foils of below .010 in. thickness with a D.C. arc to produce vacuum quality welds. Such process may be used for making butt, lap, or edge type welds, or to produce thin metal tubes, and involves backing the foil with sheets of heat-conductive metal and silicone rubber sheets.

According to this invention, the backing comprises sheets of silicone rubber and thermally conductive metal, preferably with the silicone rubber sheets located above the work, or nearer to the welding torch. While a straight polarity D.C. arc is preferable for all foil metals except aluminum, an A.C. arc is preferred for the latter and alloys thereof. Although commercially pure argon is preferred for the shielding gas, other suitable inert gases may also be used.

More specifically the invention provides for inert gas shielded arc fusion welding foil composed of metal selected from the class consisting of stainless steel, aluminum, Everdur, Inconel, palladium, titanium, and alloys thereof. The apparatus includes a metal back-up member having upper surfaces substantially in a common horizontal plane, which upper surfaces may be separated by a shallow groove or channel, and means for holding the foil with the edges of the foil to be welded touching each other over substantially the center of such channel. Such holding means comprise sheets of heat conductive metal mounted on and in direct contact with the foil, sheets of silicone rubber mounted on and in direct contact with said heat conductive metal sheets, and metal hold-down members mounted on said sheets of silicone rubber. The opposing edges or faces of the hold-down members are spaced apart, to provide a space or way for a non-consumable electrode inert gas shielded arc welding torch to move above the seam to be welded in joining such edges of the foil as the latter is so held in place.

As a result thin metal foil may be fusion welded quickly and effectively, with only slight charring of the adjacent edges of the silicone rubber sheets on opposite sides of the welded seam. Such charred edges may be trimmed off, and the sheets re-used for another weld.

Figure 2:
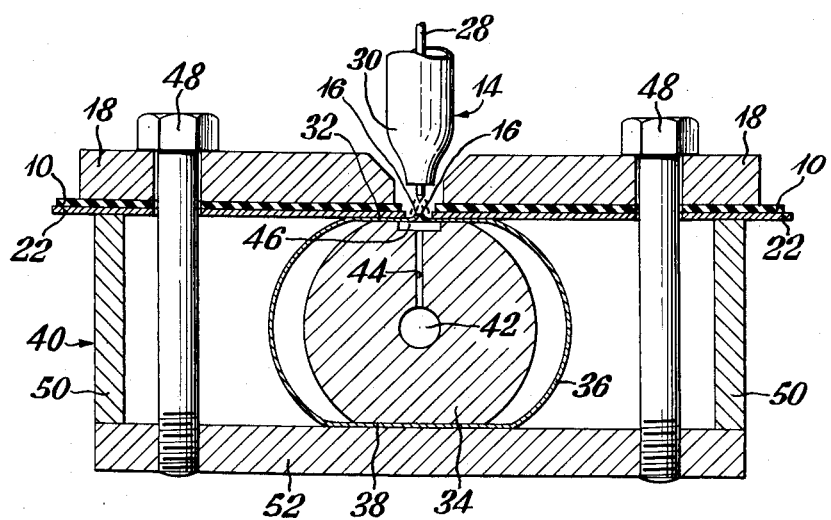

In the drawings:

FIG. 1 is a fragmentary view mainly in cross-section of apparatus illustrating the invention; and FIG. 2 is a similar view of a modification for welding tubes.

As shown in FIG. 1, a silicone rubber sheet 10 approximately 1/16 in. thick is located above the metal foil 12 being welded (i.e., on the same side as the torch 14).

The welding process of the invention is useful whenever welded thin metal foils are needed, such as for lightweight or special cryogenic equipment or vacuum panels. Both butt and lap type weld joints may be made; for butt weld joints the edges 16 of the foil sheets to be welded are turned sharply upwardly at substantially a right angle, as shown in FIG. 1.

For a particular welding setup, the stiffness of the metal foil influences to some extent the minimum thickness of foil which can be welded, especially in the case of butt welds. Stiffer materials can be successfully butt welded down to smaller thicknesses than can materials having lower modulus of elasticity, because the foil-to-foil alignment will usually be better. Also, thinner joints can be made by lap welding than by butt welding for a particular material hardness, since the mating foils are held more securely in the lap joint arrangement, whereas for butt welding the mating faces may move slightly relative to one another. For foil thicknesses above about .002 in. the hold-down clamps or bars 18 may be sufficiently far removed from the weld joint that the electrically non-conductive hold-down fixtures are not required to obtain a stable welding arc.

FIG. 1 illustrates the relative physical relationship of the parts found necessary for obtaining good quality welds. After clamping the various parts together by means of the back-up member 20 and the hold-down device including bars 18, the silicone rubber sheets 10 are trimmed flush so that not more than the vertical face need be exposed. It is desirable to have a minimum unsupported projection of the heat-conductive metal sheet 22 extend past the hold-down bar 18.

Since only the edge of the silicone rubber sheet is somewhat charred and/or partially damaged by the welding process, the two silicone rubber sheets may be subsequently re-used simply by moving them over slightly and retrimming the edges thereof as may be required. Also, if desired to facilitate the setup, each silicone rubber sheet 10 may be bonded to the corresponding heat conductive metal sheet 22, which is preferably composed of copper.

If use of back-up shielding gas is also desired, the metal back-up member 20 may be provided with a shallow groove or channel 24 under the joint between the edges of the foil sheets 12 to be welded, to which a suitable inert gas would be delivered by spaced vertical gas passages 26 from a suitable source of such gas under pressure to protect the underside of joint being welded from the ambient air. The torch 14 is provided with a non-consumable electrode 28 which is electrically connected to one terminal of the arc welding current source (not shown), the other terminal of which is connected to the work 12 by way of metal member 20. Such torch also is provided with a gas cup or nozzle 30 surrounding the electrode 28 in spaced relation, so that inert arc shielding gas, such as argon, that is delivered to the torch, flows from the cup 30 in a stream which surrounds and protects the arcing end of the electrode and the adjacent work being welded from the ambient air.

Our invention can also be used for welding tubes having inside diameters down to about 1¼ in. and possibly smaller, and has actually been used successfully by us for welding tubes of stainless steel and palladium foil. While both butt and lap joints may be made, the lap joints can be successfully made for thinner foils and are usually preferred.

As shown by FIG. 2, two parallel flat surfaces 32 and 38 are machined on a mandrel 34. The upper flat area 32 provides a smooth surface for clamping the metal foil 36 and associated sheets, while the lower flat area 38 ensures that the clamping is in parallel alignment with the work. Tubes having a limited range of diameters may be welded with a particular size jig 40, since for the larger diameter tubes, the thin foils may be bowed outward from a true circle, due to the flattened portions of the mandrel, but will not be permanently crimped.

Also a gas backup shielding arrangement substantially as described above for FIG. 1 may be used equally well when welding tubes or tubular shapes. The gas is fed in through a longitudinal hole 42 in the mandrel, which in turn feeds a multitude of small diameter holes 44 leading to the backup groove 46.

Heat conductive metal sheets 22, 22, are disposed on the foil flat surfaces, and sheets 10, 10 of silicone rubber are mounted on the sheets 12, 12, as in FIG. 1, being clamped first in place by bars 18, 18, and bolts 48, 48. The other parts of jig 40 includes uprights 50, 50 and a base plate 52. If gas below the work is not desired, mandrel 34 must be rotated 180° from the position shown by FIG. 2 to eliminate use of the back-up groove 46.

The silicone rubber sheets may be considered as an expendable item and could be applied to the mandrel in roll form periodically as required. If desired, the silicone rubber might be perforated in some pattern to allow use of backup shielding gas. For a production setup, it might be desirable to bond the silicone rubber to the top side of the mandrel, and possibly also bond the copper sheets to the silicone rubber.

A sheet 54 of glass paper about .002 in. thick may be placed under the foil being welded, as shown in FIG. 1, to reduce chilling and to permit sufficient movement of the foil work to release thermal strains and prevent hot cracking during welding. Such procedure is useful to reduce or prevent cracking either in the welds, or adjacent to the welds, in those materials such as palladium which can be and often are "hot short," i.e. brittle at elevated temperatures, and thus are most susceptible to such cracking under the thermal strains of welding. It also eliminates the need for preheating the welding fixtures, which is economically undesirable. Such use of glass paper is useful in welding either flat sheets or tubes of metal foil.

The invention has been found suitable for the welding of foil materials of aluminum, Everdur, Inconel, palladium, palladium-silver alloy, and titanium. Welding specifications for all such materials are given in the parent case, Ser. No. 783,820, or set forth below.

(1) *Aluminum.*—For welding of aluminum foil, it is preferable to use alternating current, since better cleaning of the weld puddle and a sounder weld can thus be obtained. However, due to the high thermal conductivity of aluminum, and also the decreased welding efficiency obtained with alternating current, it is necessary to increase the amperage compared both to that used for welding other less conductive foil materails, and/or when using direct current for the same foil material. Also if necessary, superimposed high frequency current may be used to provide for easier starting and to help stabilize the arc.

An important consideration when welding thin foils with alternating current is that the characteristics of the A.C. arc make it more difficult to control and confine within the small space available. Thus, when butt or lap welding aluminum foil below about .004 in. thick, it is usually preferable to have the silicone rubber under the work to allow the hold-down bars to be positioned sufficiently close to the work to clamp it securely and still not cause arc wander or shorting. Electrically non-conductive hold-hold means are necessary for such applications. As an example, for butt or lap welding of .003 in. thick aluminum foil, with the silicone rubber, on the bottom, the following welding conditions have been found to give results adequate for less exacting applications:

Arc length _____ 0.030 in.
Shielding gas ____ 20 c.f.m. argon (welding grade).
Current _____ 10 ampere alternating current, with superimposed continuous high frequency.
Welding speed ___ 12 in. per minute.

Alternately, for butt and lap welding of aluminum foils thinner than about .003 in. thick, direct current may also be used.

Also, as in example, for edge welding of .004 in. thick aluminum to ⅛ in. thick aluminum, using alternating current, the following welding conditions have been found to give satisfactory results:

Arc length _____ 0.030 in.
Shielding gas ____ 20 c.f.m. argon (welding grade).
Current _____ 50–60 ampere alternating current with superimposed continuous high frequency.
Welding speed ___ 4–6 in. per minute.

(2) *Everdur.*—In general, the welding specifications for Type 304 stainless steel as given in our application, Ser. No. 783,820, apply equally well to Everdur for butt, lap and edge welding (3) *Inconel.*—Essentially the same conditions may be used as for welding stainless steel.

(4) *Palladium and palladium-silver alloy.*—Welding palladium and most of its alloys is very similar to welding stainless steel, except the value of current must be increased somewhat. Welding conditions which give satisfactory results are listed below for flat foils of various foil thicknesses:

| Foil thickness, in | .001 | .002 | .003. |
|---|---|---|---|
| Arc length, in | .020 | .025 | .030. |
| Shielding gas, c.f.h | 15 | 15 | 20 argon (welding grade). |
| Current, amp | 3 | 8 | 10 direct current, straight polarity. |
| Welding speed, in./min | 18 | 14 | 14. |

Use of glass paper is recommended under foil composd of alloys of palladium, which metallurgically are unavoidable "hot short" to prevent cracking, as previously mentioned. For the more weldable alloys of palladium, use of the glass paper is usually not necessary.

(5) *Titanium.*—In general, the same method applies as for welding stainless steel foils, except more effective shielding with inert gas is desired, since titanium is more reactive. With improved inert gas shielding such as obtainable with specific torch designs, cup shapes, and/or use of back-up gas, better quality welds can be made. Suitable weld conditions are listed below for .002 in. thick foil:

Arc length _____ .025 in.
Shielding gas ____ 20 c.f.h. argon (welding grade).
Current _____ 4 amps. direct current, straight polarity.
Welding speed ___ 14 in./minute.

There is commercial interest in flat welding as well as edge welding the following dissimilar metals:

Palladium to austenitic stainless steel
Palladium to Inconel
Palladium-silver alloy to austenitic stainless steel
Palladium-silver alloy to Inconel
Palladium-silver alloy to low alloy steel The invention is also suitable for welding foil of such dissimilar materials. Welding conditions for these dissimilar metals are substantially the same as for welding the foil of like metals.

The silicone rubber sheets may be made more flame resistant by the addition of various filler materials, such as metal oxides, low melting ceramics, or certain inorganic salts. One useful silicone rubber containing iron oxide filler material is Union Carbide compound No. K–1046R, containing about 2% iron oxide.

Most silicone rubbers have a flammability temperature in air of at least 600° F., and are thus much less flammable than ordinary rubbers. Also, in the presence of an inert shielding gas, such as commercially pure argon, the flammability of silicone rubber is further reduced, so that it will only char due to the intense heat within the weld zone, and does not interfere with the welding process by giving off products of combustion. The preferred durometer hardness range of the silicone rubber is 30–60 durometer. Also, the thickness of the silicone rubber back-up sheets depends upon the flatness of the back-up members used, and should be a minimum consistent with obtaining uniform hold-down pressure on the foil being welded but avoid having excessive rubber material exposed to the welding arc. Silicone rubber sheet thicknesses of .030 in. to .130 in. are suitable for this invention.

It will be understood that modifications and alternatives may be made to the embodiments described, all within the spirit and scope of this invention. For example, although the invention has been described based on positioning the metal foils to be welded in a substantially horizontal plane, other desirable welding positions and relationships may be used.

What is claimed is:

1. Apparatus for inert gas shielded arc welding work-in-circuit foil composed of metal selected from the class consisting of stainless steel, aluminum, Everdur, Inconel, palladium, titanium, and alloys thereof, comprising a metal back-up member the upper surface of which is substantially in a common plane, and means for holding the foil on such surface with the edges to be welded touching each other, said holding means including heat conductive sheet metal mounted on and in direct contact with the foil, except in the area thereof to be welded, a sheet of silicone rubber mounted on and in direct contact with said heat conductive sheet metal, and metal hold-down members mounted on the silicone rubber sheet with the opposing faces thereof spaced apart to provide a way for an inert gas shielded arc welding torch provided with a non-consumable electrode, to move above and in the direction of the seam to be welded in joining such edges of the foil as the latter is held in place by said hold-down means on said back-up member.

2. Method of fusion welding metal foil the maximum thickness of which is 0.010 inch, which comprises holding the foil in place during the welding operation with a sheet of silicone rubber located on the upper side of and in direct contact with a sheet of heat conductive metal which is pressed into direct contact with such foil, and fusion welding such foil with a gas shielded arc adjacent the edge of such sheet of silicone rubber.

3. Method of fusion welding a tube of metal foil having a maximum thickness of 0.010 inch, which comprises assembling the foil to be welded in a jig with such foil turned about itself so that the edges to be welded contact each other above a mandrel located within the tube, such mandrel having flat upper and lower surfaces, clamping the corresponding parts of such foil between a bottom plate and top bars, the latter being spaced apart over the seam to be welded to provide a way therebetween for an inert gas shielded non-consumable electrode arc welding torch, holding the upper surfaces of such foil parts in place with sheets of heat conductive metal and silicone rubber located above such parts of foil and under such bars, energizing a welding arc between such foil and the electrode of such torch in a stream of inert gas from a source of arc welding power selected from the class consisting of A.C. and D.C., moving such torch along the seam to be welded in such edges of foil to fuse the latter which cools to produce a weld as the arc progresses therealong.

4. Method of fusion welding thin foil of aluminum with an A.C. welding arc, which comprises holding the foil adjacent an edge thereof to be welded with a sheet of silicone rubber which overlaps such foil above the latter, so that the corresponding edge of the silicone rubber sheet is exposed to the A.C. welding arc used to fuse such foil, energizing an A.C. welding arc between the electrode of an inert gas shielded arc welding torch and such foil edge, and moving such arc along such edge by advancing the torch in a direction parallel to the seam to be welded adjacent such silicone rubber edge which is located close enough to be charred but not burned by such arc during the fusion welding of such foil edge with such arc.

5. Method of fusion welding thin foil of aluminum as defined in claim 4, in which such edge is directly welded to another member of metal that is thicker than the foil without the aid of a welding strip.

6. Method of fusion welding metal foil which comprises solidly backing the foil to be welded with a sheet of metal of relatively high thermal conductivity which is pressed in surface-to-surface contact therewith by a sheet of silicone rubber that is, in turn, backed by a rigid backing member, striking an alternating current welding arc between said foil and a non-consumable electrode in a selected shielding gas, fusing such foil at the zone to be welded with such gas shielded arc, permitting the so-fused metal to cool and solidify, and then separating the backing members including said sheets from the so-welded foil.

7. Method of fusion welding foil as defined by claim 6, in which the sheet of silicone rubber is located above and in contact with a heat-conductive metal sheet which, in turn, is located above and in contact with the foil, and edges of such sheets are adjacent to the welding zone.

8. Method of fusion welding foil as defined by claim 2, in which the entire side of the foil opposite such heat-conductive metal sheet is in direct contact with a thin sheet of glass paper to reduce chilling and to permit sufficient movement of the foil work to release thermal strains and prevent hot cracking during welding.

References Cited in the file of this patent

UNITED STATES PATENTS

| | | |
|---|---|---|
| 2,145,937 | Lockwood | Feb. 7, 1939 |
| 2,362,505 | Smith | Nov. 14, 1944 |
| 2,631,215 | Randall et al. | Mar. 10, 1953 |
| 2,852,660 | Maloney | Sept. 16, 1958 |
| 2,952,231 | Chyle et al. | Sept. 13, 1960 |